United States Patent
Bradley et al.

(10) Patent No.: US 8,219,432 B1
(45) Date of Patent: Jul. 10, 2012

(54) AUTOMATICALLY CONTROLLING AVAILABILITY OF TASKS FOR PERFORMANCE BY HUMAN USERS

(75) Inventors: Adam D. Bradley, Seattle, WA (US); John B. Bravenec, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1065 days.

(21) Appl. No.: 12/136,673

(22) Filed: Jun. 10, 2008

(51) Int. Cl.
*G06Q 10/00* (2012.01)
(52) U.S. Cl. .............. 705/7.13; 705/7.26; 705/7.36
(58) Field of Classification Search .............. 705/11; 718/104; 707/3, 10
See application file for complete search history.

(56) References Cited

U.S. PATENT DOCUMENTS

| | | | |
|---|---|---|---|
| 5,455,875 A | 10/1995 | Chevion et al. | 382/311 |
| 5,465,308 A | 11/1995 | Hutcheson et al. | 382/159 |
| 5,805,745 A | 9/1998 | Graf | 382/291 |
| 5,826,244 A | 10/1998 | Huberman | 705/37 |
| 5,848,393 A | 12/1998 | Goodridge et al. | 705/8 |
| 5,862,223 A | 1/1999 | Walker et al. | 380/25 |
| 5,937,388 A | 8/1999 | Davis et al. | 705/8 |
| 6,012,066 A | 1/2000 | Discount et al. | 707/103 |
| 6,032,151 A | 2/2000 | Arnold et al. | 707/103 |
| 6,041,306 A | 3/2000 | Du et al. | 705/8 |
| 6,044,355 A | 3/2000 | Crockett et al. | 705/8 |
| 6,078,916 A | 6/2000 | Culliss | 707/5 |
| 6,128,380 A | 10/2000 | Shaffer et al. | 379/265 |
| 6,163,607 A | 12/2000 | Bogart et al. | 379/266 |
| 6,173,053 B1 | 1/2001 | Bogart et al. | 379/266 |
| 6,181,343 B1 | 1/2001 | Lyons | 345/358 |
| 6,182,068 B1 | 1/2001 | Culliss | 707/5 |
| 6,223,165 B1 | 4/2001 | Lauffer | 705/8 |
| 6,282,531 B1 * | 8/2001 | Haughton et al. | 706/50 |
| 6,393,497 B1 | 5/2002 | Arnold et al. | 709/330 |
| 6,539,377 B1 | 3/2003 | Culliss | 707/5 |
| 6,546,087 B2 | 4/2003 | Shaffer et al. | 379/90.01 |
| 6,584,192 B1 | 6/2003 | Agusta | 379/265.12 |
| 6,584,464 B1 | 6/2003 | Warthen | 707/4 |
| 6,587,556 B1 | 7/2003 | Judkins et al. | 379/219 |
| 6,603,854 B1 | 8/2003 | Judkins et al. | 379/265.06 |
| 6,636,590 B1 | 10/2003 | Jacob et al. | 379/114.05 |
| 6,704,403 B2 | 3/2004 | Lurie et al. | 379/114.1 |
| 6,707,904 B1 | 3/2004 | Judkins et al. | 379/265.06 |
| 6,763,104 B1 | 7/2004 | Judkins et al. | 379/265 |

(Continued)

OTHER PUBLICATIONS

U.S. Appl. No. 10/991,339, filed Nov. 16, 2004, Cohen et al.

(Continued)

*Primary Examiner* — Matthew Gart
*Assistant Examiner* — Reva R Danzig
(74) *Attorney, Agent, or Firm* — Seed IP Law Group PLLC

(57) ABSTRACT

Techniques are described for managing the release of tasks so that the tasks are available for performance, such as for tasks submitted by task requesters to be performed by human task performer users, or the release of other types of items as being available for use. In some situations, the managed release of tasks is based at least in part on determining one or more desired task performance characteristic values, and predicting appropriate values for one or more performance-related factors that will produce the determined desired task performance characteristic values. As one example, a determined target quantity of tasks to make concurrently available may be determined that will result in a desired level of task performance contention, such as based on expected or actual values for a rate of task performance and a duration of possible contention.

25 Claims, 6 Drawing Sheets

U.S. PATENT DOCUMENTS

| | | | |
|---|---|---|---|
| 6,859,523 B1 | 2/2005 | Jilk et al. | 379/32.01 |
| 6,938,048 B1 | 8/2005 | Jilk et al. | 707/102 |
| 7,155,400 B1 | 12/2006 | Jilk et al. | 705/9 |
| 7,197,459 B1 | 3/2007 | Harinarayan et al. | 704/270.1 |
| 7,721,291 B2 * | 5/2010 | McKenney | 718/104 |
| 2002/0069079 A1 | 6/2002 | Vega | 705/1 |
| 2002/0083079 A1 | 6/2002 | Meier et al. | 707/104.1 |
| 2003/0078852 A1 | 4/2003 | Shoen et al. | 705/26 |
| 2003/0200156 A1 | 10/2003 | Roseman et al. | 705/27 |
| 2003/0204449 A1 | 10/2003 | Kotas et al. | 705/27 |
| 2006/0106675 A1 | 5/2006 | Cohen et al. | 705/26 |
| 2006/0106774 A1 * | 5/2006 | Cohen et al. | 707/3 |
| 2008/0082542 A1 * | 4/2008 | Cohen et al. | 707/10 |
| 2008/0294505 A1 * | 11/2008 | Markowitz et al. | 705/11 |

OTHER PUBLICATIONS

U.S. Appl. No. 10/990,771, filed Nov. 16, 2004, Mortensen et al.
U.S. Appl. No. 11/932,060, filed Oct. 31, 2007, Cohen.
"About Spending," retrieved Nov. 23, 2004, from http://www.mypoints.com/mp/dstatial.show?isref=nmhp.popup.aboutspending.default, 1 page.
"Earning Points with MyPoints," retrieved Nov. 23, 2004, from http://www.mypoints.com/mp/dstatial.show?isref=nmhp.popup.aboutearning.default, 1 page.
"FAQs," retrieved Nov. 23, 2004, from http://www.mypoints.com/mp/dstatial.show?isref=nmhp.popup.faq.default, 1 page.
"Frequently Asked Questions about the Open Mind Initiative," retrieved Nov. 16, 2004, from http://www.openmind.org/FAQs.html, pp. 1-3.
"Frequently Asked Questions," TrueDater FAQ's, retrieved Apr. 4, 2005, from http://www.truedater.com/index.php?action=faqs, pp. 1-2.
"Grid—The Competitive Advantage," Aug. 2004, retrieved Jun. 9, 2005, from http://www.sun.com/solutions/documents/articles/grid_adv_aa.xml?null, pp. 1-2.
"Join MyPoints Now," retrieved Nov. 23, 2004, from http://www.mypoints.com/?MCK=ccb67d8c41a3819b, pp. 1-4.
"Payment-On-Line (AOL, Compuserve, INTERNET, etc)," Oct. 20, 1994, retrieved Dec. 6, 2004, from http://groups-beta.google.com/group/misc.entrepreneurs/browse_thread/thread/80fcf110252bb3f7/ff1c8, pp. 1-3.
"The ESP Game," retrieved Jun. 8, 2005, from http://www.espgame.org, 1 page.
"What is BonusMail®?," retrieved Nov. 23, 2004, from http://www.mypoints.com/mp/dstatial.show?isref=nmhp.popup.bonusmail.default, 1 page.
"What is Keen," retrieved Jun. 8, 2005, from http://www.keen.com/documents/homepage/wik_pop.asp?TID=gbFQnFLPstnUuFonMtBmHw, 1 page.
"What is MyPoints," retrieved Nov. 23, 2004, from http://www.mypoints.com/mp/dstatial.show?isref=nmhp.popup.whatis.default, 1 page.
About, Inc., "Intelligent Agents," retrieved Jun. 9, 2005, from http://psychology.about.com/od/intelligentagents/, pp. 1-5.
About, Inc., "Our Story," retrieved Jun. 9, 2005, from http://ourstory.about.com/, pp. 1-2.
About, Inc., Welcome to About.com, retrieved Jun. 9, 2005, from http://www.about.com, pp. 1-2.
Applied Skills & Knowledge, LLC, "Make Skills-Based Routing Happen," Jun. 3, 2003, retrieved from http://www.appliedskills.com/whitepapers/files/Skills-basedRouting.pdf, 3 pages.
Barlas, D., "Hipbone Connects to Kana," Jan. 5, 2004, retrieved Jun. 8, 2005, from http://www.line56.com/print/default.asp?ArticleID=5255, 1 page.
Calishain, T., "Yahoo! Service Offers More Advice than Expertise," May 6, 2002, retrieved Jul. 16, 2004, from http://www.infotoday.com/newsbreaks/nb020506-1.htm, pp. 1-2.
Dimakis, A., et al., "Decentralized Erasure Codes for Distributed Networked Storage," retrieved May 13, 2008, from http://www.eecs.berkeley.edu/~adim/DRP_IT.pdf, pp. 1-8.
distributed.net, "distributed.net History & Timeline," retrieved Jun. 8, 2005, from http://www.distributed.net/history.php, pp. 1-7.
distributed.net, "The Organization," retrieved Jun. 8, 2005, from http://www.distributed.net/, pp. 1-2.
Doan, A., "MongoMusic Fans Include Microsoft," Sep. 9, 2000, retrieved Jun. 9, 2005, from http://www.forbes.com/2000/09/09/feat2.html, pp. 1-3.
Dubaud, S., "Advice Site Resort to Legal Counsel," Jan. 4, 2002, retrieved Apr. 29, 2004, from http://news.com.com/2011-1088-801359.html, pp. 1-3.
Elance Inc., Elance Online™—Everyday Outsourcing™, retrieved Jun. 9, 2005, from http://www.elance.com/c/static/main/displayhtml.pl?file=eol.html&module=home, pp. 1-2.
Elance, Inc., "Elance History," retrieved Jun. 8, 2005, from http://www.elance.com/c/static/main/displayhtml.pl?file=heritage.html, pp. 1-3.
eLancer homepage, retrieved Jun. 8, 2005, from http://www.elancer.us/, pp. 1-2.
Epinions, Inc., Epinions.com homepage, retrieved Jun. 9, 2005, from http://www.epinions.com, pp. 1-2.
Fox, S., "Can New Technology Revolutionize the Net?," Jun. 1, 2000, retrieved Jun. 8, 2005, from http://web.archive.org/web/20001018221958/www.cnet.com/insider/0-121949-7-1995365.html, pp. 1-3.
Get a Freelancer.com homepage, Innovate it, retrieved Jun. 9, 2005, from http://www.getafreelancer.com, pp. 1-3.
gonesilent.com homepage, Aug. 22, 2000, retrieved Jun. 8, 2005, from http://web.archive.org/web/20000822122731/www.gonesilent.com/about.html, pp. 1-2.
Google, "Ask a question, Set your Price. Get your Answer.," retrieved Jun. 9, 2005, from http://answers.google.com/answers/, 1 page.
Google, "Your Computer's Idle Time is too Precious to Waste," retrieved Jun. 9, 2005, from http://toolbar.google.com/dc/offerdc.html, 1 page.
Gunn, S., "Hey, buddy, can you spare some cycles?," Sep. 24, 1997, retrieved Jun. 8, 2005, from http://www.cnn.com/TECH/9709/24/netly.news/, pp. 1-4.
Hagel, J. et al., "Go Slowly with Web Services," Feb. 15, 2002, retrieved from http://www.cio.com/archive/021502/keynote.html, 4 pages.
Hagel, J., et al., "Your Next IT Strategy," *Harvard Business Review* RO109G:105-113, Oct. 2001.
Hagel, J., *Out of the Box—Strategies for Achieving Profits today and Growth Through Web Services*, Harvard Business School Publishing, Boston, Massachusetts, 2002, Front Cover through Acknowledgements, Chapter 1, "Responding to Unmet Needs," and Chapter 2, "Web Services Create New Options," pp. i-xix and 1-42, 33 pages.
Ingenio, Inc., Ingenio™ homepage, retrieved Jun. 8, 2005, from http://www.ingenio.com/default.asp?TF=1, pp. 1-2.
Ingenio, Inc., Introducing Ingenio™ Pay Per Call™, retrieved Jun. 8, 2005, from http://www.ingenio.com/documents/corp/home.asp, pp. 1-2.
Ingenio, Inc., KEEN—Your Personal Advisor, retrieved Jun. 8, 2005, from http://www.keen.com, pp. 1-2.
Ingenio, Inc., KEEN—Your Personal Advisor/Get Advice, retrieved Jun. 8, 2005, from http://www.keen.com/categories/get_answers.asp?SRCHT=0&search=&gid=0, 1 page.
Jupitermedia Corporation, "About jGuru.com: Overview," retrieved Jun. 9, 2005, from http://www.jguru.com/misc/about-overview.jsp, pp. 1-2.
Jupitermedia Corportion, jGuru homepage, retrieved Jun. 9, 2005, from http://www.jguru.com, pp. 1-5.
KANA Inc., "Corporate Overview," retrieved Jun. 8, 2005, from http://www.kana.com/about/about.aspx, pp. 1-2.
Katz, J., et al., "The Benefits of a Virtual Contact Center," MCI, Inc., May 2004, retrieved from http://global.mci.com/us/enterprise/insight/whitepapers/pdf/VirtualContactCtr.pdf, 7 pages.
Kenexa, "Call Centers," retrieved Jun. 8, 2005, from http://www.kenexa.com/ind_callcent.html, pp. 1-3.
Lynn, R., "Keeping Online Daters Honest," Apr. 1, 2005, retrieved on Apr. 4, 2005, from http://www.wired.com/news/print/0,1294,67083,00.html, pp. 1-3.
Massive Multiplayer Online Role-Playing Game—homepage, retrieved Jun. 8, 2005, from http://www.mpog.com, pp. 1-2.

Microsoft Corporation, "Microsoft Acquires MongoMusic," Sep. 13, 2000, retrieved Jun. 9, 2005, from http://www.microsoft.com/presspass/press/2000/sept00/mongopr.mspx, pp. 1-2.

Mori, G., et al., "Breaking a Visual CAPTCHA," retrieved Jun. 8, 2005, from http://www.cs.berkeley.edu/~mori/gimpy/gimpy.html, pp. 1-4.

Mossberg, W., "GuruNet as a Reference Tool Goes Beyond Search Engines," Mar. 6, 2003, retrieved Jul. 20, 2004, from http://www.ptech.wsj.com/archive/ptech-20030306.html, pp. 1-3.

Multiplayer Online Games Directory—homepage, retrieved Jun. 8, 2005, from http://www.mpogd.com, 1 page.

Nortel Networks, "Beyond ACD- The advantages of Skill-based Routing in Today's Contact Centers," Mar. 7, 2003, retrieved from http://www.nortelnetworks.com/solutions/ccvp/collateral/nn103640-030703.pdf, 12 pages.

Online Multiplayer Games Network—homepage, retrieved Jun. 8, 2005, from http://www.omgn.com, pp. 1-2.

Project Gutenberg's Distributed Proofreaders—homepage, retrieved Jun. 9, 2005 from http://www.pgdp.net/c/default.php, pp. 1-4.

Rhodes, B., "The Wearable Remembrance Agent: A System for Augmented Memory," Appeared in *Personal Technologies Journal Special Issue on Wearable Computing* 1:218-224, 1997, retrieved Jun. 9, 2005, from http://www.bradleyrhodes.com/Papers/wear-ra-personaltech/, 10 pages.

SERENA Software, Inc., "Serena™ Automating Change," retrieved Jun. 9, 2005, from http://www.serena.com, 1 page.

SETI Institute homepage, retrieved Jun. 9, 2005, from http://www.seti.org/site/pp.asp?c=ktJ2J9MMIsE&b=178025, pp. 1-3.

Siebel Systems, Inc., Siebel homepage, retrieved Jun. 8, 2005, from http://www.siebel.com/, pp. 1-3.

Singh, P., "Open Mind: common sense—Teaching computers the stuff we all know," retrieved Jun. 9, 2005, from http://commonsense.media.mit.edu/cgi-bin/search.cgi, pp. 1-2.

Singh, P., "The Open Mind Common Sense Project," Jan. 2, 2002, retrieved Jun. 9, 2005, from http://www.kurzweilai.net/articles/art0371.html, pp. 1-24.

Spice, B., "CMU Student Taps Brain's Game Skills," Oct. 5, 2003, retrieved Jun. 8, 2005, from http://www.post-gazette.com/pg/03278/228349.stm, pp. 1-5.

Spogg.com—homepage, retrieved Jun. 8, 2005, from http://www.spogg.com, pp. 1-2.

Sun Microsystems, Inc., "Products & Technologies—Java Technology," retrieved Jun. 9, 2005, from http://java.sun.com, pp. 1-2.

Sun Microsystems, Inc., "The Jini Technology Series: JavaSpaces Principles, Patterns, and Practice," retrieved Jun. 9, 2005, from http://java.sun.com/docs/books/jini/javaspaces/, pp. 1-2.

TopCoder, Inc., Topcoder homepage, retrieved Jun. 8, 2005, from http://www.topcoder.com/, pp. 1-2.

University of California, "What is SETI@home?," retrieved Jun. 9, 2005, from http://setiathome.ssl.berkeley.edu./, 1 page.

Wilson, B. "Anti-Social Software," Apr. 30, 2004, retrieved Aug. 26, 2005, from http://www.brendonwilson.com/profile/000156.shtml, 5 pages.

Wolverton, T., et al., "Yahoo Launches Advice Site," Apr. 29, 2002, retrieved Apr. 29, 2004, from http://news.com.com/2102-1017_3-894968.html?tag+st.util.print, pp. 1-2.

\* cited by examiner

Task Group A Availability Determination Information

| | Duration Of Possible Contention For A Task (seconds) | Probability Of Task Contention | Rate Of Task Performance (tasks / second) | Quantity Of Concurrently Available Tasks |
|---|---|---|---|---|
| 251 | 0.005 | 0.01 | 1 | 1 |
| 252 | 0.005 | 0.01 | 10 | 5 |
| 253 | 0.005 | 0.01 | 100 | 50 |
| 254 | 0.005 | 0.01 | 500 | 249 |
| 255 | 0.005 | 0.01 | 1000 | 498 |
| | ... | | | ... |

Task Group B Availability Determination Information

| | Duration Of Possible Contention For A Task (seconds) | Probability Of Task Contention | Rate Of Task Performance (tasks / second) | Quantity Of Concurrently Available Tasks |
|---|---|---|---|---|
| 261 | 30 | 0.001 | 10 | 299850 |
| 262 | 30 | 0.005 | 10 | 59850 |
| 263 | 30 | 0.01 | 10 | 29850 |
| 264 | 30 | 0.05 | 10 | 5849 |
| 265 | 30 | 0.1 | 10 | 2847 |
| 266 | 30 | 0.001 | 100 | 2998500 |
| | ... | | | ... |

Fig. 2

AUTOMATICALLY CONTROLLING AVAILABILITY OF TASKS FOR PERFORMANCE BY HUMAN USERS

BACKGROUND

As the use of the Internet and the World Wide Web ("Web") has become widespread, it is increasingly common for users to access and use various types of capabilities provided by remote computing systems over the Web, including to search for, shop for and order products (such as goods, services and/or information) that are for purchase, rent, lease, license, trade, evaluation, sampling, subscription to, etc. After a user places an order for one or more such products (e.g., via a Web merchant or other online retailer, via an electronic marketplace, etc.), the order is fulfilled, such as by providing goods that have been ordered through physical distribution channels (e.g., shipment via a governmental postal service or private common carrier) or electronically (e.g., via download over the Internet, such as for digital music or videos) as appropriate. Ordered services may similarly be provided electronically (e.g., providing email service) or physically (e.g., performing cleaning services at the purchaser's house).

In addition to such user-initiated interactions (e.g., interactions initiated by users using Web browser applications to interactively request Web pages from Web servers), software programs on remote computing systems may also interact for various purposes and in various ways. For example, there is growing use of the Web to provide so-called "Web services," which typically involve the programmatic interaction of remote applications to exchange information via defined APIs ("application program interfaces"). Web services allow heterogeneous applications and computers to interact, and may be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. Such URI-based invocation requests may, for example, be based on the use of XML over HTTP (e.g., as part of the REpresentational State Transfer, or "REST", distributed interaction model that focuses on resources). In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services. Furthermore, various other types of programmatic interaction mechanisms have been developed and used, including remote procedure call ("RPC") protocols, various object-oriented and other architectures such as CORBA ("Common Object Request Broker Architecture"), Java RMI ("Remote Method Invocation"), JavaSpaces, Jini, JXTA, UPnP ("Universal Plug and Play") and DCOM ("Distributed Component Object Model"), and a variety of middleware programs that connect separate applications (e.g., various EDI, or "Electronic Data Interchange," networks).

Unfortunately, while Web services and other programmatic interaction mechanisms allow various application programs and computers to interact, such interactions are typically limited in various ways. For example, the types of information and functionality that are available to be requested using such programmatic interactions are typically restricted to very limited types of requests that the remote computer systems and applications can automatically fulfill (e.g., to provide a specified predefined group of information, such as a Web page or file, or to perform a specified database query on a specified database).

BRIEF DESCRIPTION OF THE DRAWINGS

FIG. 2 illustrates example information that may be used to determine how and when to release tasks as being available for performance.

DETAILED DESCRIPTION

Figure 1:
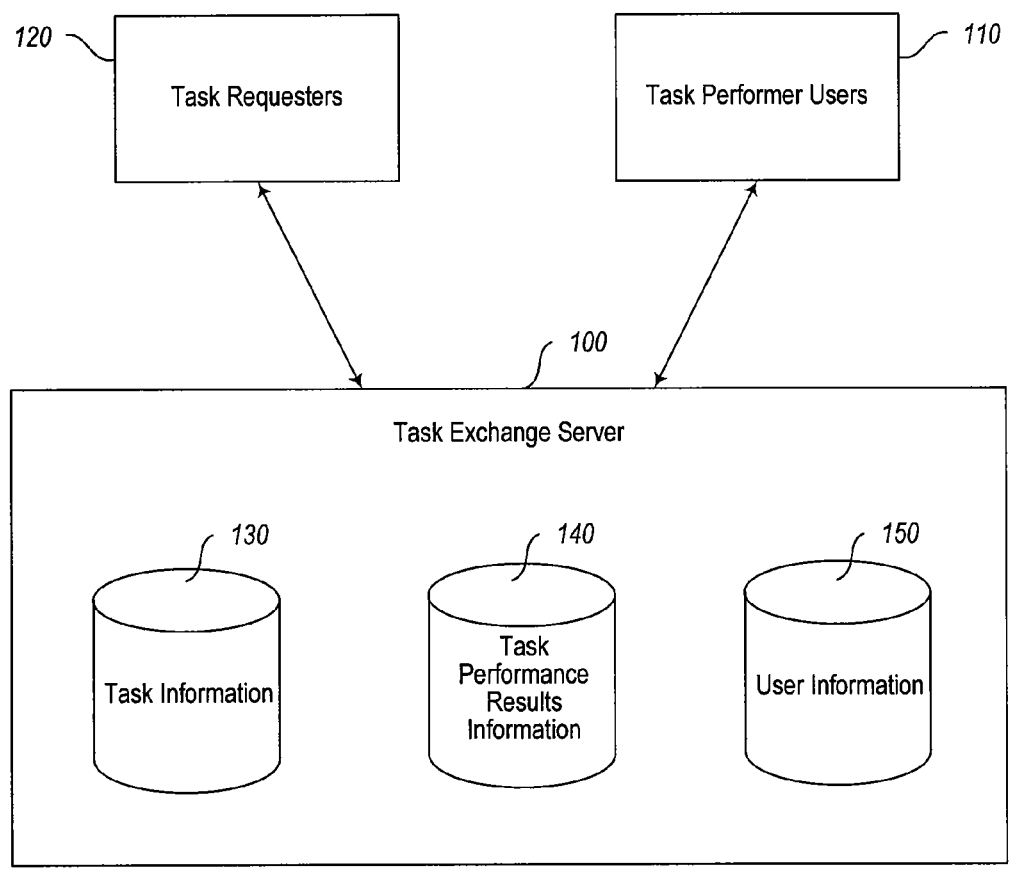
FIG. 1 is a block diagram illustrating an example embodiment of a system that facilitates the managed release of tasks as being available for human performance.

Techniques are described for facilitating the automated determination of circumstances under which to release items as being available for use, such as when contention to use the items may occur and when the items are used at a determinable rate, and with the release of multiple related items being managed in such a manner as to satisfy desired characteristics for such item usage. As discussed in greater detail below, the availability of a group of multiple items may be automatically managed in various ways, including in some situations by determining a target quantity of the items to concurrently make available for use, such as a determined target quantity that is predicted to produce desired usage characteristics for the group of items.

In at least some embodiments, the items whose availability is managed include tasks to be performed by humans, such that a particular item may be assigned to one or more human task performer users who use the task by performing it (e.g., in exchange for a fee) to the possible exclusion of other human task performer users. In particular, in at least some embodiments, an electronic task exchange server system acts as an intermediary between task requesters who have tasks available to be performed and task performer users who are available to perform tasks, such as to facilitate human task performer users performing tasks supplied by task requesters. Such a task exchange server system (also referred to as a "task exchange server") may perform a variety of types of functionality to facilitate task performance, as discussed in greater detail below, and in some such embodiments may include one or more components that automatically manage the availability of at least some of the tasks in accordance with the described techniques. In addition, in at least some embodiments, at least some of the tasks to be performed are human performance tasks that may be difficult or impossible for computers and software programs to automatically perform, such as that use cognitive and other mental skills of human task performer users (e.g., by employing judgment, perception and/or reasoning skills of the human task performer users, such as the ability to form opinions, to perform abstract or common-sense reasoning, to perform various discernment and perception tasks that may include visual and aural pattern recognition, to use cultural awareness and emotional intelligence, and to perform various other everyday yet highly complex kinds of perception, cognition, reasoning and thinking).

As previously noted, in at least some embodiments, the availability of tasks or other items is managed so that task performance or other item usage occurs in accordance with desired task performance characteristics or other item usage characteristics. Such desired characteristics may have various forms in various embodiments, and may be determined in various ways (e.g., specified by a task requester user for a group of submitted tasks, specified by a human operator of the task exchange server system, selected from default values used for some or all tasks, etc.). For example, as discussed in greater detail below, desired task performance characteristics for performance of a group of multiple tasks may in some embodiments include one or more measures of timeliness related to the performance of the tasks of the group, such as timeliness measures related to the regularity of the completion of the tasks over a period of time, to the amount of time until the performance of a first subset of one or more of the tasks are completed, to the total amount of time for the performance of all the tasks of the group to be completed, etc.

Furthermore, desired task performance characteristics for a group of multiple tasks by multiple task performer users may in some situations reflect a level of contention that may occur between task performer users who attempt to concurrently perform the same task, such as a desired maximum level of contention, a range of allowable or preferred contention levels, a range of disallowed or non-preferred contention levels, one or more particular target contention levels, etc. The contention between task performer users for some or all tasks (e.g., related tasks that are part of a common group or type) may be measured and expressed in various manners in various embodiments, including as a percentage of times that a task performer user attempts to perform an available task but is unable to do so due to another task performer user instead being assigned that task for performance, as a rate of contention occurrences over time, as a cumulative total number of contention occurrences, etc. Such task performance contention may occur, for example, if a particular task is to be performed by a fixed number of additional distinct task performer users (e.g., 1 total task performer users with no task performer users having yet performed the task; N total distinct task performer users with X task performer users having already performed the task, where 0<=X<N; etc.), and more than that fixed number of additional distinct task performer users attempt to perform that particular task concurrently or otherwise during a duration of time in which the ability to select the task for performance is temporarily available to only a subset of those additional task performer users.

The duration of time during which possible contention may occur between task performer users for a particular task (or between other entities using other types of items) may vary in various embodiments and for different types of tasks. As one particular example, in some embodiments, multiple task performer users may be working on related tasks of a first group that are sufficiently similar that the task performer users each request any available task of the group for performance, and the task exchange server system selects one of the available tasks of the group for each of the task performer users (e.g., randomly)—in such situations, the duration of possible contention for a particular available task that is selected may be very short (e.g., milliseconds), such as to correspond to the time during which the task exchange server system is performing a database lock on that selected task for a particular task performer user (e.g., to allow the status of the task to be changed from being available for performance to being assigned to the task performer user for performance, such that the task performer user receives a period of exclusivity to perform the selected task after the task is assigned to him/her). Even with a short duration of possible contention for available tasks, however, contention may occur if a single task is selected for or by multiple task performer users, such that multiple software processes each attempt to simultaneously assign that task to a different task performer user via a database lock or other similar mechanism. Moreover, in some situations a duration of possible contention may be much longer than milliseconds, with the potential for contention increasing correspondingly. For example, multiple task performer users may be working on related tasks of a second group that are sufficiently different that the task performer users prefer to review available tasks for potential performance before selecting a task, and if so the task exchange server system may provide a task performer user with a temporary period of time for that review during which the task being reviewed is temporarily reserved for only that task performer user—in such situations, the duration of possible contention for a particular available task being reviewed is that temporary review time, which may, for example, be seconds or minutes.

As previously noted, desired task performance characteristics may in at least some embodiments also include one or more measures of timeliness related to the performance of the tasks of the group (e.g., related to the regularity of the completion of the tasks over a period of time and/or to the rapidity of completing performance of a first subset of one or more of the tasks), whether in addition to or instead of desired task performance characteristics related to task contention. Such timeliness of performance of a group of multiple tasks may further be affected if the tasks of the group are each to be performed by multiple distinct task performer users, since completion of performance of a task does not occur until all of those multiple distinct task performer users have performed the task. For example, if 10,000 tasks are each to be assigned to and performed by 3 distinct task performer users (for a total of 30,000 task assignments), and task assignments are performed on average at a rate of 30 per second, it will take approximately 1,000 seconds (or 16.7 minutes) to complete the performance of all 30,000 task assignments—however, while the average task completion rate over the 16.7 minutes will be ~600 tasks per minute (10,000/16.7), the completion of the tasks will be significantly irregular if all 10,000 tasks are made concurrently available, since most of the tasks will be completed near the end of the 16.7 minute period of time and few (if any) tasks will be fully completed during the first minute. This is due to each task being completed only after it is assigned to and performed by three distinct task performer users, which takes progressively longer as the quantity of available tasks grows. In particular, probability theory indicates that for the similar coupon collector's problem, the wait to complete a task may increase on average by a factor of $N*\log(N)$ as the quantity N of concurrently available tasks grows. However, in many situations it may be desired that the performance of the tasks of the group occur with a specified level of regularity (e.g., for the prior example, between 500 and 700 tasks per minute, or as close to 600 tasks per minute as possible) and/or with a specified level of rapidity (e.g., for the prior example, that the first 600 tasks be completed within 2 minutes, or that the first 600 tasks be completed within as close to a minute as possible, or that the first task be completed within as short a time as possible).

In addition to or instead of desired characteristics related to timeliness of performance and/or level of contention, desired task performance characteristics or other item usage characteristics may include various other characteristics in other embodiments, including any other aspect of task performance that the task exchange server system does not directly control and that may be of interest.

Furthermore, the availability of tasks or other items is managed in at least some embodiments based on various performance-related factors that the task exchange server system may be able to directly control and/or monitor, and that affect the actual task performance characteristics or other item usage characteristics that occur. Such performance-related factors may have various forms in various embodiments, and may in some situations vary with the particular desired task performance characteristics or other item usage characteristics that are of interest. For example, the rate at which task performer users perform task assignments for tasks of a group, the quantity of concurrently available tasks for a group, and the duration of possible contention for tasks of a group are all performance-related factors that in at least some embodiments and situations may affect one or more task performance characteristics for the tasks of the group. In other embodiments, other performance-related factors may be used, whether in addition to or instead of the previously indicated performance-related factors.

The managing of availability of tasks or other items based on desired task performance characteristics and performance-related factors may in at least some embodiments include predicting inter-relationships between various performance-related factors and desired characteristics, such as to allow the task exchange server system to specify values to be used for one or more performance-related factors that are controlled by the task exchange server system in order to obtain expected task performance characteristics in accordance with desired characteristics. In particular, in at least some embodiments, the task exchange server system may determine a target quantity of tasks of a group to make concurrently available, such that maintaining that target quantity of available tasks is expected to result in one or more desired task performance characteristics. In general, as the target quantity of concurrently available tasks increases for a group of tasks, the likelihood of contention between task performer users decreases for tasks of the group, the regularity of performance of tasks of the group over a period of time decreases, and the rapidity decreases of the completion of the performance of a first subset of one or more of the tasks of the group. In this manner, a tradeoff may occur between desired characteristics that may be of benefit to task performer users (e.g., a low likelihood of contention) and that may be of benefit to a task requester user who submitted the tasks of the group (e.g., a high rapidity of the tasks of the group beginning to be performed, such as for a first subset of one or more tasks; a high regularity of tasks of the group being completed throughout a time period during which the tasks are performed, such as instead of being completed primarily at the end of the time period; etc.).

As one particular example, in at least some embodiments, the contention probability C that contention will occur for a task may be predicted based on performance-related factors that include the rate R at which task performer users perform task assignments for tasks of a group, the target quantity Q of concurrently available tasks for the group, and the duration D of possible contention for tasks of the group, such as by using the following first performance prediction formula:

$$C = 1 - e^{-D*R/Q}$$

which can also be rewritten as $-D*R = Q*\ln(1-C)$, and solved for any of the other variables D, R and Q. Accordingly, given expected, measured or specified values for three of the four variables, a corresponding value for the other variable may be predicted. Thus, for example, given a maximum desired probability of contention, a corresponding minimum target quantity of concurrently available tasks may be determined, given a particular rate of task assignment performance and duration of possible contention. FIG. 2 provides additional details regarding examples based on use of this first performance prediction formula. Furthermore, in other embodiments, similar performance prediction formulas may be used for one or more timeliness-related task performance characteristics, such as in place of the contention probability C. In other embodiments, other performance prediction formulas may be used for contention probability and/or other task performance characteristics, or instead task availability may be managed in other manners without use of such a performance prediction formula, such as based at least in part on monitoring actual task performance and adjusting performance-related factors.

In at least some embodiments, the managing of availability of tasks or other items based on desired task performance characteristics and performance-related factors may in at least some embodiments include monitoring actual task performance and adjusting performance-related factors accordingly. For example, in some embodiments, the first performance prediction formula (or other related formula) may be used to determine initial values to be used for one or more performance-related factors for a group of tasks (e.g., an initial target quantity of concurrently available tasks to be used for the group in order to provide a desired probability of contention), and then actual performance of some of the tasks of the group may be monitored. In such situations, if the actual contention rate is measured to be sufficiently different than the desired probability contention (if the contention rate is directly measureable), such as by more than a predefined amount, and/or if one or more measured performance-related factors (e.g., rate of actual performance of task assignments for tasks of the group, or duration of possible contention) differ from what was initially expected, then one or more performance-related factor values (e.g., the target quantity value) may be dynamically adjusted one or more times so that the future expected probability contention reaches the desired probability contention (e.g., by matching it exactly, by being within a predefined differential, etc.). Alternatively, in other embodiments, an initial target quantity value or other initial performance-related factor values may not be determined using a performance prediction formula (e.g., to instead use default values, values manually specified by a task requester and/or a human operator of the task exchange server, etc.), and then one or more of the performance-related factor values may similarly be dynamically adjusted until one or more actual task performance characteristic values reach their desired values, such as by using control theoretic techniques or other similar techniques.

As previously noted, in at least some embodiments, the described techniques may be performed by an electronic task exchange server system that acts as an intermediary to allow task requesters and task performer users to interact. In particular, in some embodiments, one or more computing systems providing the task exchange server system act as an intermediary to allow task requesters to programmatically request (e.g., via programmatic invocations of one or more APIs of the task exchange server system by application programs of the task requesters) that tasks be performed by human task performers and to receive corresponding results after the tasks are performed (e.g., as responses to the programmatic invocations), thus providing a form of artificial artificial intelligence to task requesters' application programs. Similarly, human task performers may access the task exchange server system (e.g., in a programmatic or interactive manner) to obtain information about available tasks that they may perform and to provide the results of task performance after the completion of tasks that they are assigned. By enabling large numbers of unaffiliated or otherwise unrelated task requesters and task performers to interact via the intermediary task exchange server system in this manner, free-market mechanisms mediated by the Internet or other public computer networks may be used to programmatically harness the collective intelligence of an ensemble of unrelated human task performers. Additional details related to the function and operation of various embodiments of task exchange server systems, such as a task fulfillment facilitator system embodiment, are included in pending commonly-owned U.S. patent application Ser. No. 10/990,949, filed Nov. 16, 2004 and entitled "Providing an Electronic Marketplace to Facilitate Human Performance of Programmatically Submitted Tasks;" in U.S. patent application Ser. No. 11/334,773, filed Jan. 17, 2006 and entitled "Performing Automated Price Determination For Tasks To Be Performed;" and in U.S. patent application Ser. No. 11/842,730, filed Aug. 21, 2007 and entitled "Transferring Entity-Related Data Between Storage Partitions;" each of which is hereby incorporated by reference in its entirety.

FIG. 1 is a block diagram illustrating an example of users interacting with a remote system that stores various data and provides various types of functionality, with embodiments of such a system able to use various of the described techniques for automatically managing the release of tasks as being available to be performed by human task performer users. In particular, in this example, the system storing the data is a task exchange server system 100 that provides functionality related to human performance of tasks, such as by managing data related to tasks and to users who supply and/or perform the tasks. For illustrative purposes, some examples and embodiments are described herein in which specific types of users interact with specific types of systems in specific ways, and in which the systems store specific types of data and provide specific types of related functionality, including specific types of techniques for managing availability of tasks to be performed by task performer users. The following examples and embodiments are provided for illustrative purposes and are simplified for the sake of brevity, and the techniques disclosed herein can be used in a wide variety of other situations, some of which are described herein.

For example, in other embodiments, the described techniques may be used in other manners, including to manage the availability of items other than tasks to be performed. As previously noted, the described techniques may be employed to manage the availability of any type of item whose use in one or more roles at a determinable rate may result in contention and for which one or more desired usage characteristics are determined (e.g., a particular desired level of contention for use of the items, a desired regularity of use of the items, a desired rapidity of use of a first subset of one or more of the items, etc.), including when each item is to be used multiple distinct times. A non-exclusive list of example types of items and usage roles with which the described techniques may be used are as follows: selecting from a group of ads or other content pieces to be presented to users or otherwise used, such as when a group of ads is being displayed at a given rotation rate and each ad is to be presented a fixed number L times (e.g., by selecting a target quantity of ads to make concurrently available given a duration of possible contention for each ad selection and use, such as to obtain a desired level of contention for each selection of the ad if simultaneous presentation is not possible or not preferred, or such as to obtain a desired level of contention for the Lth last selection of an ad if it is preferable or required to prevent the ad from being used more than L times); selecting a transmission rate to be used for data (e.g., streaming audio or video) being sent over a network, such as when bandwidth contention (e.g., dropped data packets or other transmission failures) increases as the total data rate that is being transmitted increases (e.g., by selecting a target total data rate to use that corresponds to a desired probability of bandwidth contention for transmission of each data packet given a duration of possible contention for each data packet); determining whether to allow a transaction to be performed or other type of functionality to be provided to a user by a system, such as when contention to complete a transaction or provide other functionality increases as the quantity of concurrent system use increases (e.g., by selecting a target quantity of concurrent users or concurrent use transactions for the system that corresponds to a desired probability of contention for each transaction or other provision of functionality given a duration of possible contention for each transaction or other provision of functionality); limiting use of an item for which a total number of uses is allowed and for which use contention may occur (e.g., a product that is available for purchase and for which limited inventory exists, such that a potential purchaser may place the product in an electronic shopping cart while it is available but experience contention based on the product no longer being available when the potential purchaser attempts to perform a checkout operation), such as by controlling a rate at which information about the item is provided to potential users (e.g., in search results for which the item would otherwise be included) or a rate at which opportunities to use the item are otherwise made available (e.g., by selecting a target rate of attempted uses that is controlled by managing the opportunities that are provided to use the item, such that the target rate corresponds to a desired probability of contention for each attempted use given a duration of possible contention for each use over a period of time during which it is desired that some item use availability will persist); etc. For example, with respect to a situation in which the described techniques are used to manage the availability of a group of multiple ads that are each to be displayed a specified number of times L, a usage prediction formula similar to that of the first performance prediction formula may be used to determine a target quantity of the ads to make concurrently available for selection, such as based on a rate R at which ads of the group will be selected and displayed, a duration D of possible contention for ads of the group (e.g., a length of time to select and display the ad, if only one instance of the ad is displayed at a time; a length of time to perform a database lock in order to update a number of times of display for the ad, such as to prevent the ad from being displayed more than L times; etc.), and a desired contention probability C that contention will occur when selecting an ad to be displayed. Similar usage prediction formulas may be used for other types of items and situations.

With respect to FIG. 1, the task exchange server 100 may be implemented in various ways in various embodiments, such as in the form of a software system executing on one or more computing systems or devices (e.g., in a distributed manner, such as on a peer-to-peer or grid network). Furthermore, while not illustrated in this example embodiment, in some embodiments data may be stored across multiple alternative storage partitions on multiple alternative computing nodes, such that at least some types of data are stored only on a single partition. For example, data within the system 100 may be organized based on users with which the data is currently associated, so as to store a group of data related to a particular user together on a particular storage partition, and with each user being associated with one of the alternative computing nodes whose storage partition stores data for the user. The associated alternative computing node for a user may further provide at least some of the functionality of the system 100 to the user, such as to process and respond to various types of requests received from the user. In addition, the types of tasks to be performed may have various forms in various embodiments. For example, there is a large class of tasks which computers and application programs cannot easily automatically perform, but which humans can typically easily perform, referred to herein as "human performance tasks." In at least some embodiments, the task exchange server 100 may facilitate the submission and performance of such human performance tasks. The ability of humans to perform such tasks is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

In the example of FIG. 1, the task exchange server 100 includes a task information data repository 130, task performance results information data repository 140, and a user information data repository 150. Various task requesters 120 may interact with the task exchange server 100 in order to supply tasks that are available to be performed by task performer users 110, as well as to perform other related activities. For example, in addition to supplying tasks, a task requester 120 may interact with the task exchange server 100 to obtain results from the performance by one or more task performer users 110 of previously supplied tasks, to obtain information about an account of the task requester (e.g., information about financial payments made to other users for performing tasks supplied by the task requester, information about previously specified preferences, etc.), to search for information about tasks and/or about task performer users who are available to perform tasks, to specify types of qualifications that task performer users may need to perform supplied tasks, to specify or modify preferred or required desired task performance characteristics associated with designated tasks or groups of tasks, etc. The task requesters 120 may take various forms, such as a task requester user who interactively accesses the system 100 (e.g., via a GUI, or graphical user interface, displayed on a computing system of the task requester user, not shown, such as a GUI based on Web pages provided by the system 100 and/or based on execution of a client-side application on the computing system), or a software application that is programmatically interacting with the system 100 (e.g., via an API of the system 100, not shown) on behalf of a related task requester user.

When a task requester supplies information about one or more tasks, the task exchange server 100 stores the task-related data in the task information data repository 130, which may then be made available to task performer users 110 to perform the tasks in a manner specified by the task requester or otherwise determined by the task exchange server 100, such as by releasing the tasks as being available to be performed in accordance with the described techniques (e.g., as determined by a task availability determiner component, not shown, of the task exchange server system 100). The supplied information for a task may include a variety of types of information, including details related to the task (e.g., information to be analyzed, a question to be answered, etc.), one or more qualifications of any task performer user who performs the task, one or more geographical locations associated with the task, one or more capabilities and/or other current characteristics of one or more devices to be used as part of performing the task, one or more criteria related to desired task performance characteristics, one or more other criteria related to task performance (e.g., deadlines for completion, format of results from task performance, etc.), one or more associated rewards (e.g., monetary payments) to be provided to one or more task performer users who successfully perform the task, etc.

The task exchange server 100 also provides various functionality related to the performance of tasks by task performer users 110. For example, when a task performer user requests information about available tasks (e.g., as part of a search or browse request), the task exchange server 100 provides task-related data obtained from the task information data repository 130, such as for tasks that have been released as being available to be performed. In addition, when a task performer user requests to perform (or is assigned for performance) a particular task, the task exchange server 100 stores a temporary association between the task performer user and the task (e.g., in the task performance results information data repository 140). Then, when the task performer user has completed performance of the task, such as by providing task results for the performed task to the task exchange server 100, the task exchange server 100 stores the task results in the task performance results information data repository 140. The task exchange server 100 may also perform other related functions, such as notifying a task requester of the task results and/or completion of the performed task, facilitating a reward for performing the task (e.g., by crediting an account associated with the task performer, initiating a funds transfer, etc.), etc.

The task exchange server 100 also provides various functionality related to the management of various users, such as task requester users and task performer users. For example, such users may register with the task exchange server 100 by providing identifying information (e.g., name, address, telephone number(s), email addresses, etc.), possibly accompanied by various user preference information and/or payment information that may be used to facilitate payments between task requesters and task performer users for the performance of tasks. Such user-related information may be stored by the task exchange server 100 in the user information data repository 150, and the task exchange server system 100 may further in some embodiments store various user-related information in the repository 150 (e.g., information about previous interactions between the system and the user, such as to reflect aggregate information about previous task performance for task performer users). In addition, task performer users 110 may also in at least some embodiments obtain qualifications that may be utilized for purposes of matching task performer users with appropriate tasks, with such qualification information also being stored in the user information data repository 150.

Furthermore, the task exchange server 100 may also provide functionality related to automatically managing the release of tasks so as to make them available to be performed by one or more task performer users 110, such as via a task availability determiner component (not shown). For example, the task exchange server 100 may designate certain tasks or groups of tasks received from one or more task requesters 120 as subject to a managed release mechanism, such as based on availability criteria specified by the task requesters or otherwise automatically determined by the task exchange server, and may designate certain other tasks or groups of tasks received as being available for immediate or near-immediate release to task performer users 110, such as due to a lack of any such criteria and/or due to such criteria being currently satisfied. The task exchange server 100 may designate a task as having a "released" or "available" status by storing identifying information in the task information data repository 130, such as to allow task performer users 110 to discover and perform tasks so designated (e.g., by searching for available tasks, such as tasks meeting specified characteristics; by browsing various types or categories of available tasks; by receiving indications of tasks that the task exchange server automatically provides to the task performer users; etc.). Furthermore, in at least some embodiments, task availability criteria may be associated with and applied to groups of one or more tasks at various times, such as for multiple tasks submitted together (e.g., as a batch) and/or for multiple tasks submitted for a single group at multiple distinct times. Such groups of tasks may be identified in various ways, such as by being designated by the task requester and/or by being automatically identified by the task exchange server (e.g., to group tasks submitted by a task requester that share one or more related types and/or that otherwise share one or more attributes such as price, duration, etc., and optionally if such tasks are further submitted sufficiently close in time to each other). Furthermore, in at least some embodiments, task requesters may be allowed to define and save sets of one or more availability criteria, and/or the task exchange server system may provide one or more predefined sets of one or more availability criteria. In such embodiments, when a task requester submits one or more tasks to be performed, the task requester may further indicate one or more of such sets of availability criteria to be used with the tasks being submitted. The availability criteria may also be specified in various forms in various embodiments, such as rules, business logic, programming language statements, values; etc., and in accordance with one or more task performance characteristics and/or performance-related factors.

Figure 3:
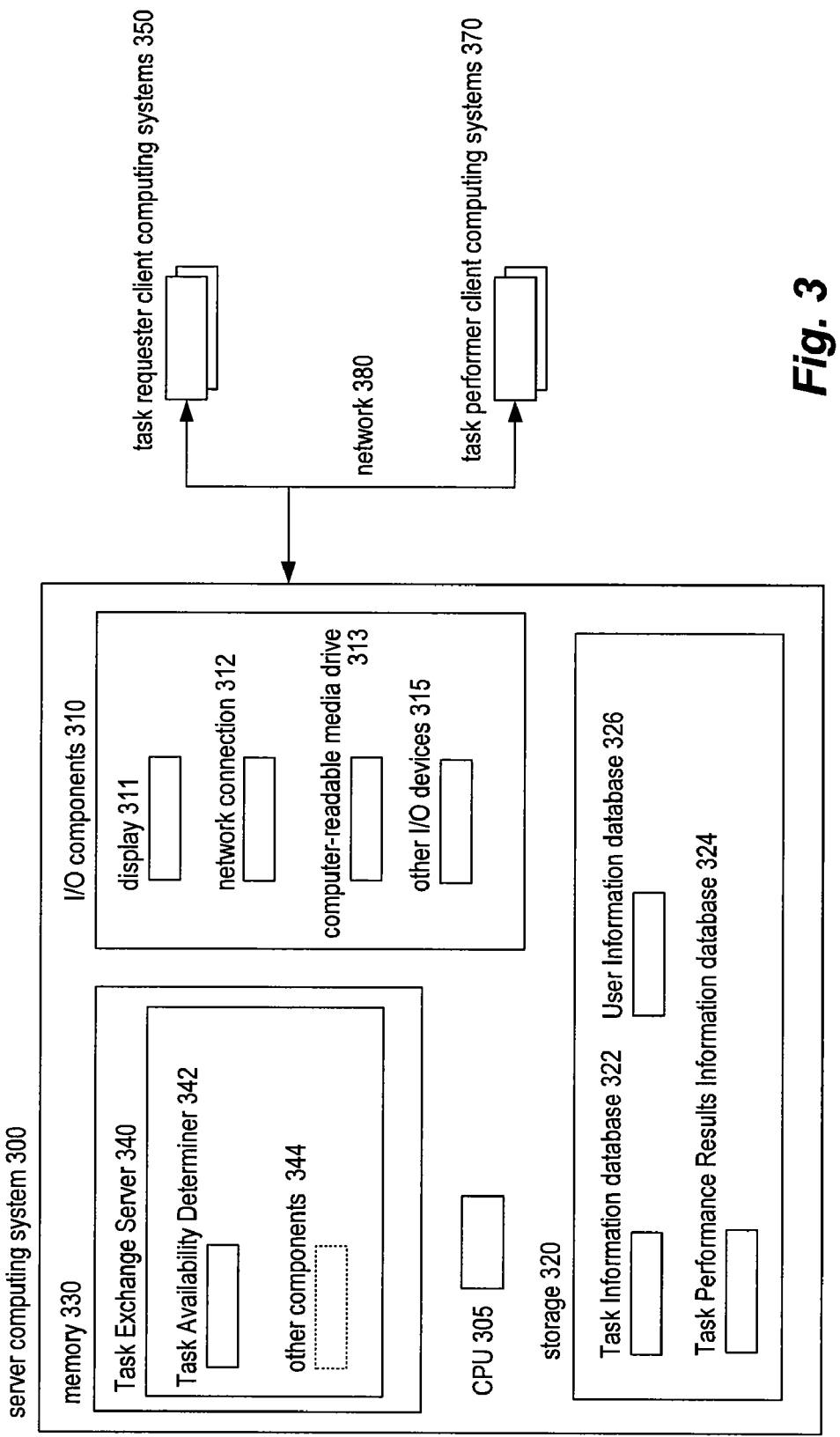
FIG. 3 is a block diagram illustrating an example computing system suitable for executing an embodiment of a system that facilitates managing the availability of tasks for human performance.
Figure 5:
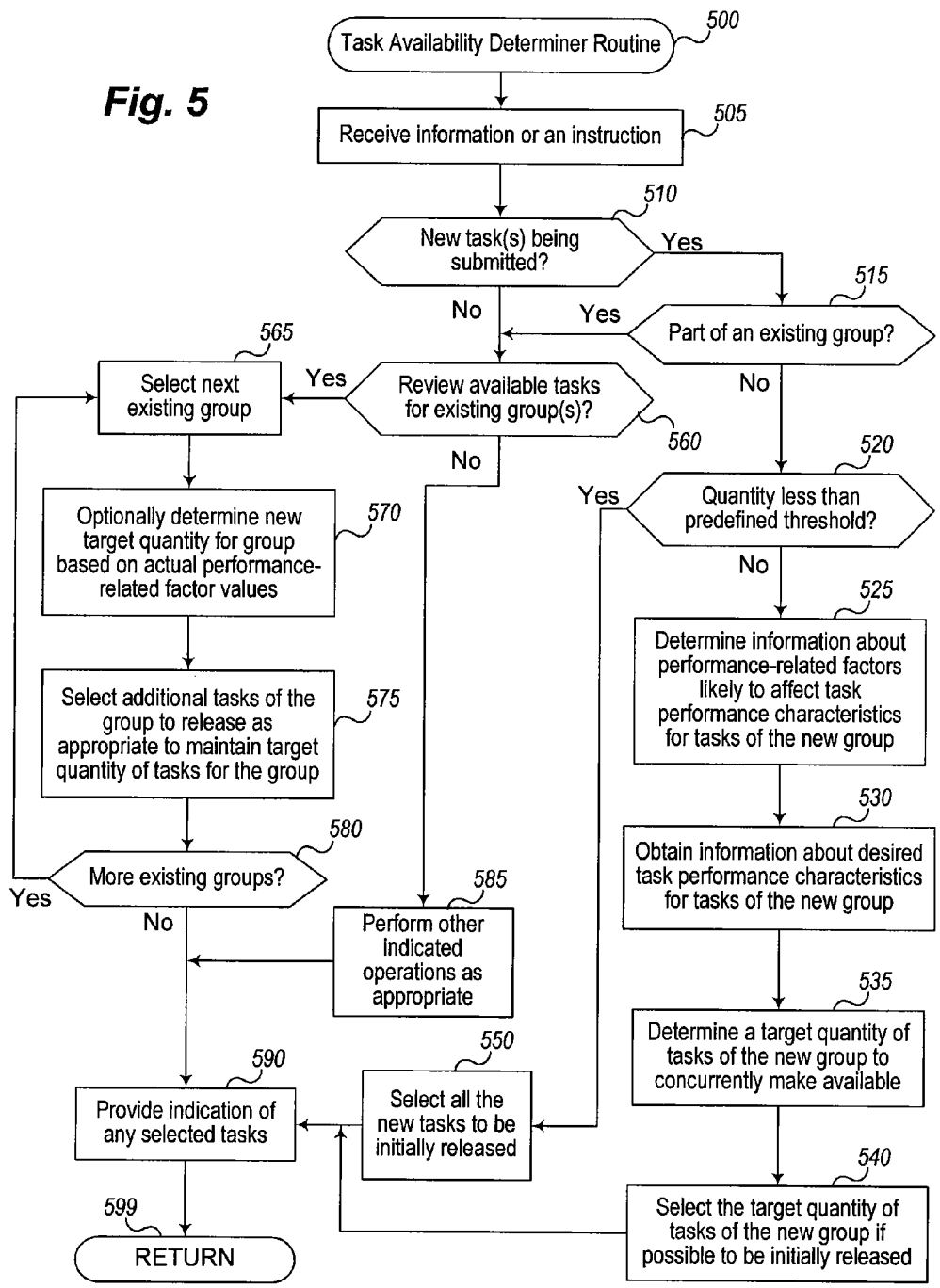
FIG. 5 is a flow diagram of an example embodiment of a Task Availability Determiner routine.

FIG. 2 illustrates example information 250 and 260 that may be used by an embodiment of the task exchange server system to determine circumstances under which to make certain tasks available for performance, such as, for example, by an embodiment of the Task Availability Determiner component 342 of FIG. 3, a similar component of the task exchange server 100 of FIG. 1, and/or with respect to routine 500 of FIG. 5. Such example information 250 and 260 may further be used in various ways, such as to determine a target quantity of tasks of a group to concurrently make available for performance in order to satisfy desired performance characteristics for the tasks of the group, or instead in other embodiments to determine how variations in such a target quantity and/or in other performance-related factors may affect performance characteristics for tasks of the group. In addition, as discussed in greater detail elsewhere, such example information 250 and 260 may be used at various times in various embodiments, such as to initially select values to use for one or more performance-related factors when tasks of a group are first released for performance (e.g., based on expected values for other performance-related factors), and/or to modify values being used for one or more performance-related factors for tasks of a group to reflect actual performance data for other previously performed tasks of the group. Such example information 250 and 260 may in some embodiments and situations be dynamically determined when one or more of the tasks of a group are submitted (e.g., for a first subset of the tasks that are submitted), or instead may be predetermined before such task submission (e.g., for various combinations of performance-related factors and task performance characteristics, in response to definition of a type of task or specification of expected performance-related factors for one or more tasks, etc.). Furthermore, in at least some embodiments, such example information 250 and 260 may be generated based at least in part on empirically generated data that corresponds to actual performance of tasks (e.g., by initially predicting expected values for one or more performance-related factors based on possible values for other types of performance-related information, and then adjusting those predicted expected values based on subsequently obtained empirical data; by monitoring actual performance of some tasks and determining initial values for at least some of the performance-related factors based on empirical data from the monitoring; etc.).

In the example of FIG. 2, a first group 250 of information is shown for a first example group of tasks, referred to in this example as Group A. The example information 250 includes columns 250a-250d that each indicates performance-related information for tasks of the group, with each of the rows 251-255 indicating a different combination of performance-related information values. In this example, the tasks of Group A are expected to have a duration of possible contention between task performer users for a particular task of approximately 5 milliseconds, as shown in column 250a—such a contention duration may correspond to, for example, an amount of time for a database lock to occur in which an available task is selected and reserved for a particular task performance user to begin performance of the task. In addition, the illustrated information 250 includes an indication 250b that the desired probability of contention between multiple task performer users for a single task is to be 1% in this example. Given that desired task contention probability and expected duration of possible contention, columns 250c and 250d indicate expected target quantities of concurrently available tasks of the group that will satisfy the desired task contention probability given varying average rates of task performance for tasks of the group. Thus, as illustrated in row 251, for example, if on average one task is performed each second, then maintaining one concurrently available task is expected to result in a task contention probability of approximately 1%. As the rate of task performance grows, as illustrated in rows 252-255, the target quantity of concurrently available tasks similarly grows. In this example, the example predicted task-related information 250 is based on the previously discussed first performance prediction formula, but in other embodiments may be determined in other manners (e.g., using other types of prediction formulas, determined based on monitored actual performance of prior tasks, etc.).

A similar group of information 260 is also illustrated in FIG. 2 for a second example group of tasks, which is referred to in this example as Group B. In this example, the tasks of Group B have a duration of possible contention 260a that varies significantly from that of column 250a of information 250, and in particular corresponds to an average period of 30 seconds during which a task may be unavailable to other task performer users, such as based on a task performer user being given a temporary exclusive ability to select a task for performance (e.g., while the task performer user reviews information about the task and elects whether or not to perform it). In this example, the rows 261-265 of information 260 indicate a variety of different task contention probabilities 260b, such that column 260d indicates target quantities of concurrently available tasks that correspond to the associated desired task contention probability 260b if an average rate of task performance 260c is ten tasks per second. Row 266 corresponds to a higher average rate of task performance, and in this example has the same desired task contention probability as that of row 261. Similarly, rows 252 and 263 have the same task contention probabilities and rates of task performance, but differing durations of possible contention and corresponding target quantities of concurrently available tasks. As with information 250, the information 260 is determined in this example based on the first performance prediction formula as previously discussed, but may be determined in other manners in other embodiments.

It will also be appreciated that in other embodiments other performance-related factors and/or desired task performance characteristics may be used, such as based on different types of tasks and/or different embodiments of a task exchange server system. In addition, as discussed in greater detail elsewhere, such information may similarly be determined for selecting items of types other than tasks to be performed. Furthermore, it will be appreciated that the details of FIG. 2 are provided for illustrative purposes only, and that other embodiments may use other types of information to determine whether and when to release tasks for performance by one or more task performer users.

FIG. 3 is a block diagram illustrating a computing system suitable for executing an embodiment of a system that facilitates the managed release of tasks as being available for human performance. In particular, FIG. 3 illustrates a server computing system 300 suitable for executing an embodiment of a task exchange server system 340, as well as various task requester client computing systems 350, and task performer client computing systems 370. In the illustrated embodiment, the server computing system 300 includes a CPU 305, various I/O components 310, storage 320, and memory 330. The I/O components in this example include a display 311, a network connection 312, a computer-readable media drive 313, and other I/O devices 315 (e.g., a keyboard, mouse, speakers, etc.).

An embodiment of the task exchange server 340 (e.g., a software implementation of the task exchange server 100 described with reference to FIG. 1) is executing in the memory 330, and it interacts with the other computing systems 350 and 370 over a network 380 using the network connection 312 (e.g., via the Internet and/or the World Wide Web). The illustrated embodiment of the task exchange server system 340 includes a Task Availability Determiner component 342, and optionally one or more other components 344. As described in greater detail elsewhere, the task exchange server may provide various functionality to act as an intermediary to facilitate performance by task performer users of tasks supplied by task requesters, and the component 342 may provide various functionality related to automating the managed release of tasks by implementing at least some of the techniques described herein. The task exchange server 340 and its components may also access and use various task-related and user-related information on storage 320, such as in task information database 322, task performance results information database 324, and user information database 326. The task information database 322, task performance results information database 324, and user information database 326 are respective database systems that may, for example, be used to implement the task information data repository 130, task performance results information data repository 140, and user information data repository 150 described with reference to FIG. 1.

Human task requester users may use, for example, application programs (not shown) executing on the task requester client computing systems 350 to communicate via the network 380 with the task exchange server 340, such as to submit tasks to be performed (e.g., groups of tasks with associated task availability criteria) and obtain results of performance of such task by task performer users. In addition, human task performer users may utilize Web browsers or other programs (not shown) executing on the task performer client computing systems 370 to communicate via the network 380 with the task exchange server 340, such as to perform tasks and provide task performance results. The programs used by the task requester users and/or task performer users may, for example, include custom client applications that communicate via standard and/or proprietary protocols with the task exchange server 340 and/or some intermediary application (e.g., a Web server). In some embodiments, the task exchange server 340 may further provide an API that provides programmatic access to at least some of the functionality provided by the task exchange server 340.

It will be appreciated that computing systems 300, 350, and 370 are merely illustrative and are not intended to limit the scope of embodiments of the present disclosure. The task exchange server 340 may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a "client" or "server" computing system or computing device or a computing node may comprise any combination of hardware, firmware, or software that can interact, including (without limitation) desktop or other computers, network devices, PDAs, cellphones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the task exchange server 340 may in some embodiments be provided via various components, and may be combined in fewer components or distributed in additional components than those described herein. Similarly, in some embodiments, the functionality of some of the components may not be provided as part of the task exchange server 340 and/or the task availability determiner component 342, and/or other additional functionality may be available. Furthermore, in other embodiments, a component similar to the task availability determiner component 342 may be used in other situations, such as to manage availability of items other than tasks.

It will also be appreciated that, while various elements are discussed or illustrated as being stored in memory or on storage while being used, these elements or portions of them can be transferred between memory and other storage devices for purposes of memory management and data integrity. Alternatively, in other embodiments some or all of the software components may execute in memory on another device and communicate with the illustrated computing system via inter-computer communication. Furthermore, in some embodiments, some or all of the components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4A:
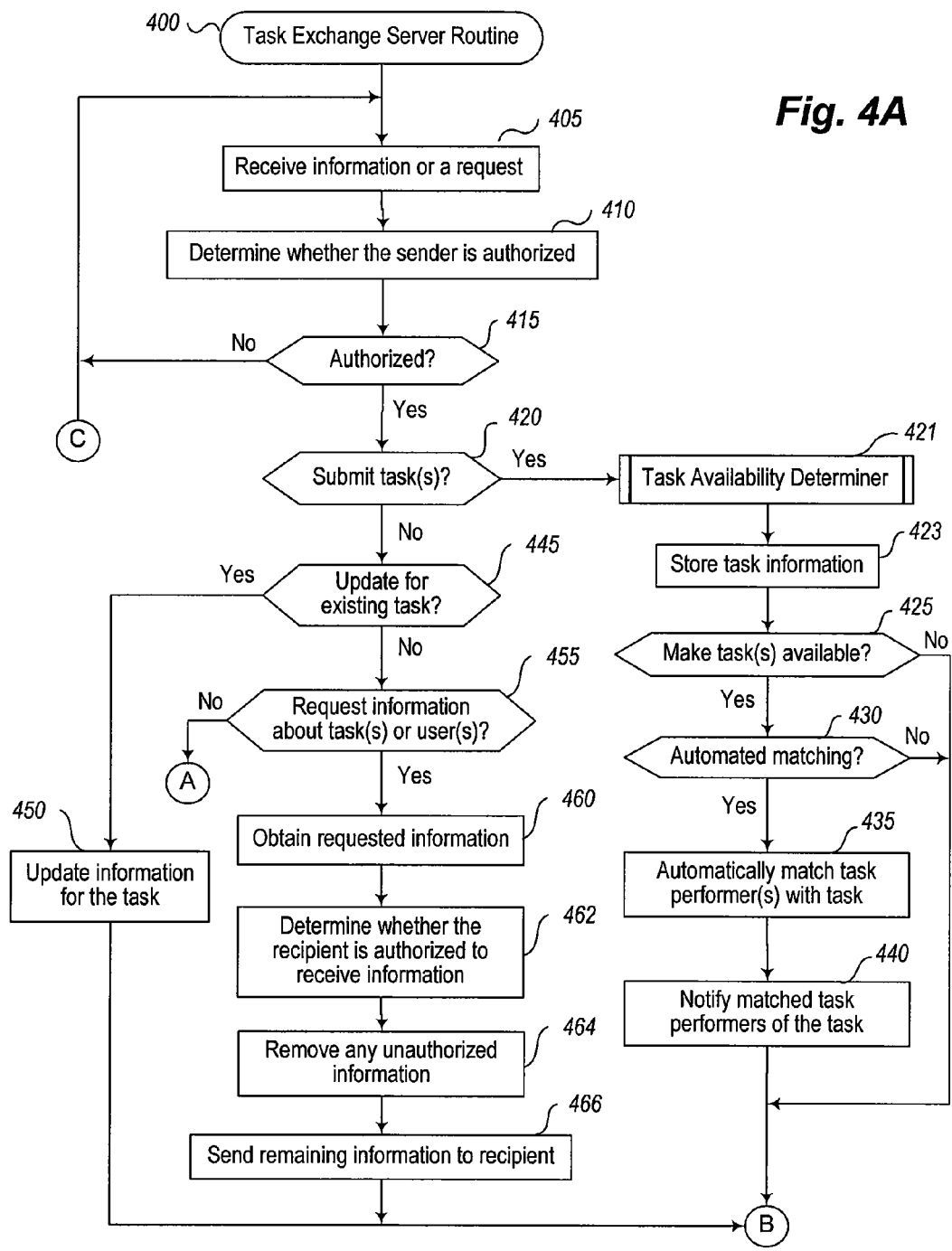
FIGS. 4A and 4B are a flow diagram of an example embodiment of a Task Exchange Server routine.
Figure 4B:
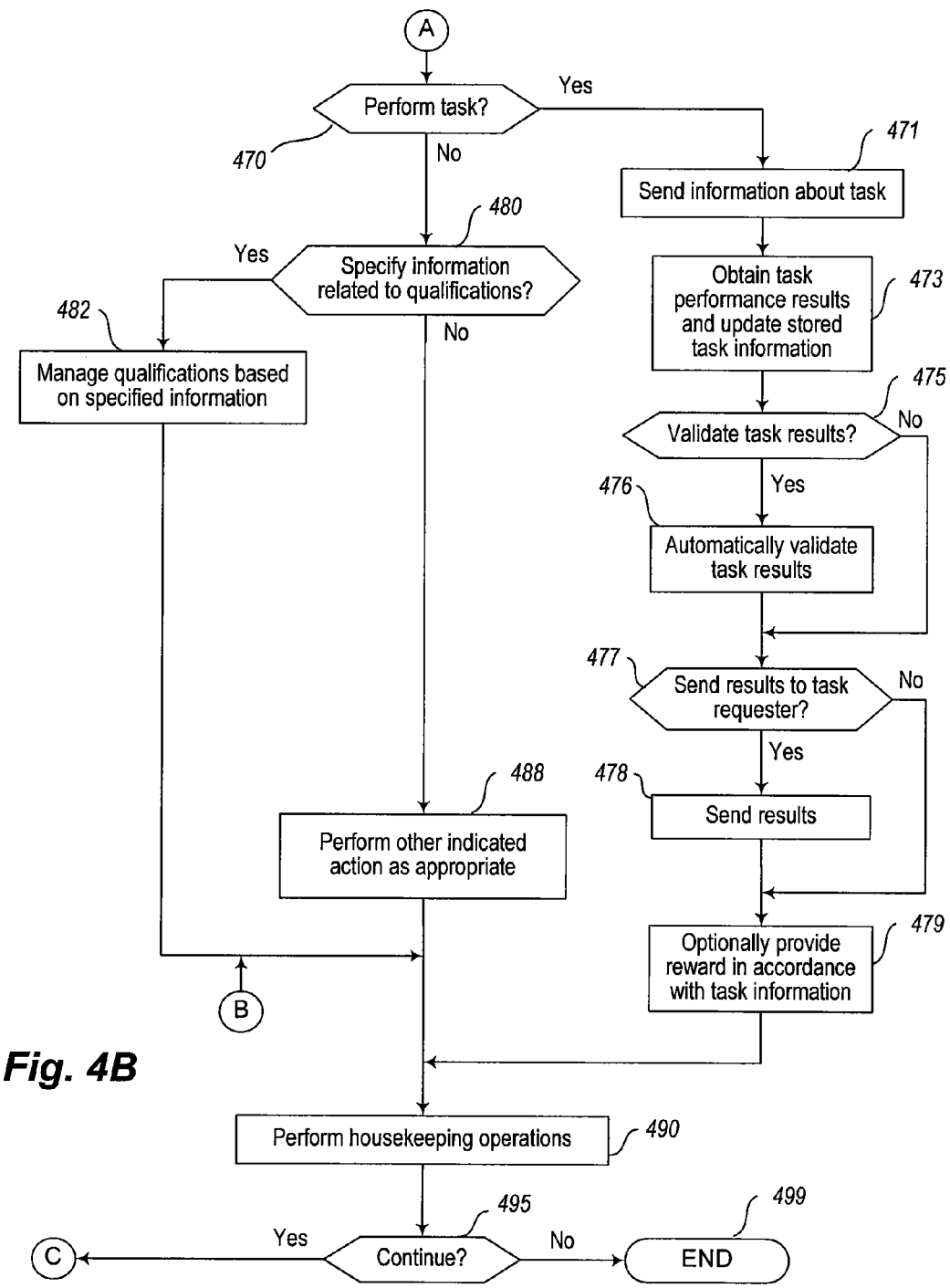

FIGS. 4A and 4B are a flow diagram of an example embodiment of a Task Exchange Server routine 400. The routine may be provided by, for example, execution of an embodiment of the task exchange server 100 of FIG. 1 and/or the task exchange server 340 of FIG. 3, such as to in this illustrated embodiment facilitate performance of tasks by interacting with task requesters and task performer users as appropriate, as well as to manage the release of tasks as being available for performance by task performer users.

In overview, the routine interacts with task requesters and task performers to perform multiple functions, including, for example, to automatically manage the release of tasks according to specified criteria and/or current system conditions, respond to requests to submit tasks, update existing tasks, respond to requests for information, respond to requests from task performer users to perform a task, to manage qualifications based upon specified information, etc. Once tasks have been released (e.g., made available to be performed, such as by storing appropriate information in one or more data repositories such as task information database 130 in FIG. 1), task performer users may explicitly request to perform those tasks from the task exchange server. According to the illustrated embodiment of the task exchange server, tasks may be released as being available for performance by task performer users in one of two ways. In a first manner, tasks are submitted and made available to task performer users soon after being received (e.g., in a realtime or near-realtime manner), such as when submitted without task availability criteria or when a task availability determiner component of the task exchange server does not automatically determine any task availability criteria to use. In a second manner, tasks are submitted but are not immediately made available to task performer users, such as when submitted with or determined to be associated with one or more associated task availability criteria. In some scenarios, the task exchange server releases tasks according to one mechanism or the other exclusively. In other scenarios, some tasks are released without delay, and others according to the managed release mechanism. In yet other scenarios, the different mechanisms are employed at different times, or a particular embodiment of the task exchange server may provide only functionality for one of managed release and non-managed immediate release. Other alternatives are possible.

In this illustrated embodiment, the routine begins at block 405, where an indication is received of information or a request, and in block 410 determines whether the sender of the information or request is authorized to perform requests of that type or provide information of that type (e.g., based on prior registration of the users with the task exchange server system, and/or on other previously defined access controls for specific users or types of users).

If the routine identifies the sender as authorized in block 415, the routine continues to block 420 to determine whether the received indication was a request to submit one or more tasks. If so, the routine continues to block 421 to execute a Task Availability Determiner routine to determine whether to release the submitted task(s) immediately or in a managed manner, with an example of such a routine being illustrated with respect to FIG. 5. As described in greater detail with respect to FIG. 5, the Task Availability Determiner routine may further in some situations consider whether to release other previously submitted tasks, such as to maintain a desired target quantity of concurrently available tasks for task groups to which those tasks belong. While in this example embodiment the block 421 is illustrated as being performed for each one or more tasks that are submitted, in other embodiments the block 421 may be performed at other times, such as periodically or in response to occurrence of a triggering event (e.g., submission of a minimum quantity of additional tasks, performance of previously released tasks, etc.). In addition, while the task release controller routine is shown here as being invoked by the task exchange server routine, in other embodiments the task availability determiner routine may execute in other manners, such as a separate asynchronous process or thread of execution that processes requests from the task exchange server and/or other requesters until terminated. Other organizations and architectures are possible and contemplated. After block 421, the routine continues to block 423 to store information about the submitted task(s) (e.g., information received in block 405). In addition, if the routine 421 indicates one or more of the submitted tasks and/or one or more previously submitted tasks that are to be released, such information is similarly stored in block 423 (e.g., by changing the stored status for such indicated tasks to being available for performance).

After block 423, the routine continues to block 425 to determine whether one or more tasks were indicated by block 421 as being released to be available for performance. If so, the routine then continues to block 430 to determine whether to perform automated matching to identify task performer users who are appropriate to perform those tasks, such as based on the type of tasks and/or an explicit request by the submitters of the tasks, although in other embodiments such automated matching functionality may not be provided. In the illustrated embodiment, if automated matching is to be performed, the routine continues to block 435 to automatically match one or more task performer users with the task by, for example, identifying one or more task performer users whose qualifications satisfy any qualification criteria for the new task. The routine then notifies those identified task performer users of the task in an appropriate manner in block 440 (e.g., based on previously specified user preferences for those task performer users). After block 440, or if it was instead determined in block 425 that no tasks are being released as being available or in block 430 that automated matching was not to be performed for tasks being released, the routine continues to block 490.

If it is instead determined in block 420 that the received indication is not to submit one or more tasks, the routine continues instead to block 445 to determine whether a request was received to perform an update for an existing task, and if so continues to block 450 to perform the update as appropriate. Such updates may take a variety of forms, such as to modify information about or delete a pending task that has not been performed; to perform an indicated activity related to a task (e.g., to cause a reward to be provided to a task performer user after the task requester has reviewed and accepted task performance results from that task performer user); to add, modify, or remove performance criteria associated with an existing task; to add or modify task availability criteria associated with a task that has not yet been released (e.g., a task that is part of a group having at least some tasks of the group that have not yet been released), etc.

If it is instead determined in block 445 that the received indication is not to update an existing task, the routine continues to block 455 to determine whether the received indication is a request for information about one or more tasks and/or one or more users, such as for a search or browse request. For example, in some embodiments, a task performer user may request information for a task of an indicated group of tasks, such as to allow the task performer user to preview information about that task and determine whether to perform it. In such embodiments, a particular task from that group may be automatically selected from the currently available tasks of that group in various ways (e.g., randomly; based on giving priority to certain tasks, such as the tasks that have been released and available for performance the longest or such as the tasks that have already been performed by any or the most other task performer users; etc.), and the automatic selection of a task may further be performed in at least some embodiments such that multiple different task performer users requesting information regarding a single task group are not likely to receive information about the same task (e.g., to minimize contention between the multiple task performer users). Furthermore, the selected task may in at least some such embodiments be temporarily reserved for the task performer user (e.g., for 30 seconds, for a few minutes, etc.) so that it remains available for the task performer user to perform during that period of temporary reservation. If it is determined in block 455 that the received indication is a request for information about one or more tasks and/or one or more users, the routine continues to block 460 to identify and obtain the requested information, and then continues to block 462 to determine whether the indicated recipient of the information is authorized to receive all of the obtained information, such as based on access controls associated with any aspects of the obtained information (although in other embodiments the access determination may be made before or as part of the obtaining of the information, or instead may not be performed). In block 464, the routine then removes information for which the recipient is not authorized, if any, and in block 466 sends any remaining information to the recipient. In some embodiments, indications may be provided to the recipient of any removed information for which they were not authorized, while in other embodiments such indications may not be provided. As previously noted, in some embodiments task performer users may not be provided with any information about tasks that are being held for release but not yet released (e.g., such that the task performer users are unaware of the existence of any such tasks), although in other embodiments at least some task performer users may be able to obtain at least some information about such tasks being held for release (e.g., a quantity of tasks of a group being held, but without other details, such as for task performer users who have already performed or who are considering whether to perform one or more other already released tasks of the group). After blocks 450 or 466, the routine continues to block 490.

If it is instead determined in block 455 that the received indication is not a request for information about tasks or users, the routine continues instead to block 470 to determine whether the received indication is a request from a task performer user to perform an indicated available task. If so, the routine continues to block 471 to retrieve and provide information about the indicated available task to the task performer user in an appropriate manner (e.g., in a manner specified for the task), and in block 473 obtains and stores results of performance of the task by the task performer user. For example, in embodiments in which a task performer user may preview tasks before performance, the indicated available task may be a particular task previously previewed by the task performer user (e.g., a task about which information was previously provided to the task performer user with respect to block 466), while in other embodiments the indicated available task may be a task of an indicated group that is automatically selected for the task performer user in block 471 (e.g., based on the task performer user indicating that he/she will accept any task of the indicated group for performance, with the particular task being selected randomly or in another manner as previously discussed). In block 475, the routine then determines whether to validate the task results, such as based on whether a task requester has specified that the results for the task are to be validated. If so, the routine continues to block 476 to automatically validate task results. Validating task results may be performed in various ways, such as type checking the task results (e.g., by determining whether the task result comprises an integer or other type of data), range checking the task results (e.g., by determining whether a task result is within a particular value range), etc. In other embodiments, validation of task results may not be performed.

After block 476, or if it is instead determined in block 475 not to validate the task results, the routine continues to block 477. In block 477, the routine then determines whether to immediately send the task results to the task requester, such as based on information associated with the task, the outcome of the automated validation of block 476, and/or user preferences for the task requester. If so, the routine continues to block 478 to send the results. After block 478, or if it is instead determined in block 477 not to send the results to the task requester at this time, the routine continues to block 479 to optionally provide any reward associated with the task to the task performer user, such as in accordance with the task information and/or the outcome of the automated validation of block 476. After block 479, the routine continues to block 490.

While the illustrated embodiment indicates a synchronous flow in which the routine waits for and obtains task performance results in block 473 after sending the task information in block 471, in other embodiments the routine may be structured in other manners, such as to continue with other processing while waiting for such task results (if any) to be received. In addition, in some situations, task performer users may not provide task results for a task after they accept an assignment to perform the task, which may be indicated to the routine in an explicit message from the task performer user that the task performer user is abandoning or withdrawing from task performance, or instead by not receiving task results within a specified period of time—if so, the routine may continue to handle other task-related requests and information. In addition, while not illustrated here, in other embodiments various types of notifications may be sent to task requesters related to their submitted tasks, such as when a task is assigned to a task performer user for performance and/or when an assigned task is withdrawn from a task performer user who has not completed the performance.

If it is instead determined in block 470 that the received indication is not to perform a task, the routine continues instead to block 480 to determine whether the received indication is to specify information related to user qualifications, and if so continues to block 482 to manage qualifications based on the specified information. Managing qualifications may include, for example, defining a new type of qualification for use with the system, specifying a particular qualification for a particular user, removing a particular qualification from a user, removing a particular qualification from the system, etc.

If it is instead determined in block 480 that the received indication is not to specify qualification-related information, the routine continues instead to block 488 to perform another indicated operation as appropriate, such as to receive and store various types of user information (e.g., information related to a user's identity or attributes, information related to an account of a user with the system, etc.), information related to specifying access controls for information and/or functionality, administrative requests related to system operations, requests for information related to monitoring performance of tasks or other operations of the system, information from a task performer user indicating a withdrawal from or abandonment of an assignment to perform a task, information related to defining a type of task or group of tasks (e.g., information about preferred or required task performance characteristics or other task availability criteria for such tasks), etc.

After blocks 440, 450, 466, 479, 482, or 488, the routine continues to block 490 to optionally perform any additional housekeeping operations, such as to store information that is generated or received during execution of the routine, to generate summary aggregate information for the system related to tasks and users, to take appropriate actions when events do not occur within specified periods of time (e.g., to withdraw assigned tasks from task performer users who do not timely perform the tasks, or to provide rewards to task performer users for tasks that they have performed when task requesters do not timely reject the task results provided by the task performer users), etc. In addition, in at least some embodiments, the routine may in block 490 execute the Task Availability Determiner routine in a manner similar to that of block 421, such as to determine whether to maintain previously determined target quantities for tasks of existing groups (e.g., to release additional tasks of such groups to replace tasks that were previously released and performed tasks). After block 490, the routine continues to block 495 to determine whether to continue. If so, or if it is determined in block 415 that the sender was not authorized, the routine returns to block 405, and if not continues to block 499 and ends.

FIG. 5 illustrates an example embodiment of a Task Availability Determiner routine 500. The routine may be provided by, for example, execution of the Task Availability Determiner component 342 of FIG. 3 and/or as a portion of the task exchange server 100 of FIG. 1. In addition, the routine may be invoked at various times, such as with respect to blocks 421 and/or 490 of FIGS. 4A and 4B, or instead by another system (e.g., by a third-party system, such as in exchange for a fee). In the illustrated embodiment, the routine 500 is repeatedly invoked in response to information or instructions that are received, and then returns after appropriate corresponding actions are taken—in other embodiments, the routine may instead execute in other manners, such as to execute continuously to respond to received requests and to monitor ongoing performance of tasks. Furthermore, in the illustrated embodiment, a target quantity of available tasks is maintained by the task exchange server for a group of tasks by managing the release of the tasks of the group, such that unreleased tasks are not available for task performer users to perform (or in some embodiments, to even view or otherwise obtain information about). In other embodiments, a target quantity of available tasks may be maintained in other manners, such as by releasing all tasks of the group as being available for performance, but using a software component or other interface that task performer users interact with to restrict access to some of the available tasks. For example, such a software component may be configured to maintain the target quantity of available tasks for a group of tasks by restricting information about available tasks of the group that is provided to some or all task performer users, such that information about only a target quantity subset of all the available tasks of the group is provided to task performer users at any given time (e.g., if the groups of the task are ranked or otherwise prioritized, the target quantity subset of all the tasks that are prioritized the highest).

In the illustrated embodiment, the routine 500 begins at block 505, where an indication is received of information or an instruction. The routine continues to block 510 to determine whether information received in block 505 includes one or more new tasks that are being submitted to the task exchange server for performance. If so, the routine continues to perform blocks 515-550 to determine circumstances under which to release the tasks as being available for performance, such as by determining desired performance characteristics for the tasks and determining which of the new tasks to release for performance by task performer users in accordance with those desired performance characteristics. In particular, the routine first continues to block 515 to determine whether the one or more new tasks being submitted are part of an existing task group for which desired performance characteristics have already been determined, and if so continues to block 560. Such determination may be made in various ways, such as based on information provided by the task requester with the tasks, based on attributes of the tasks, etc. Otherwise, the routine continues to block 520 to determine whether the quantity of new tasks being submitted is less than a predefined threshold for establishing a new group whose tasks' availability will be managed. If so, the routine continues to block 550 to select all of the new tasks to be initially released as being available. In other embodiments, such a predefined threshold may not be used, or instead a determination of whether sufficient new tasks are being submitted is instead performed with respect to the determined target quantity discussed below with respect to block 535 (e.g., to release all new submitted tasks unless there are more than the determined target quantity).

If it is instead determined in block 520 that sufficient new tasks have been submitted (or if a predefined threshold is not used), the routine continues instead to block 525 to determine information about performance-related factors that are likely to affect task performance characteristics for tasks of the new group. As discussed in greater detail elsewhere, such performance-related factors may in at least some embodiments include information about a likely duration of possible contention for a task and an expected rate of performance of tasks of the group, as well as other possible factors in other embodiments. The information may be determined in various manners, such as based on a definition of a type of task for the group (e.g., as may be supplied by the task requester that submits the task, automatically determined by the task exchange server system, etc.), or in other manners in other embodiments (e.g., based on monitoring actual performance of other related tasks, based on the number and/or particular characteristics of task performer users who are currently available to perform the tasks and/or who are expected to be available to perform the tasks in a relevant future time period, etc.).

The routine then continues to block 530 to obtain information about desired performance characteristics related to performing tasks of the new group, such as a desired minimum and/or maximum probability of contention between task performer users when performing tasks, a desired regularity of performance of tasks of the group over a period of time during which those tasks are performed, a desired rapidity of performing an initial subset of one or more of the new tasks being submitted, etc. In a manner similar to that of block 525, the information obtained in block 530 may be from various sources in various embodiments, including as specified by a task requester who submitted the new tasks, as automatically determined by the task exchange server system, default values used for all tasks, etc. After block 530, the routine continues to block 535 to use the information determined and obtained in blocks 525 and 530 to determine a target quantity of tasks of the new group to concurrently make available that are expected to result in the desired task performance characteristics based on the determined information about the performance-related factors. As discussed in greater detail elsewhere, such target quantity information may be determined in various manners, such as based on use of the first performance prediction formula or other similar performance prediction formulas. In addition, in other embodiments, values for one or more other performance-related factors may be determined for factors over which the task exchange server has control, such as in addition to or instead of a target quantity. As one example, in some embodiments and situations the task exchange server may have at least some control over the rate at which tasks of the current group are performed (e.g., by controlling which task performer users are allowed to perform such tasks, such as by not providing information to at least some task performer users that identifies available such tasks and/or by restricting some task performer users from currently performing any tasks), and if so may determine a target rate of task performance that will be maintained.

In block 540, the routine next selects the determined quantity of tasks of the new group (or all of the new tasks if the quantity of the new tasks is less than the determined target quantity), and indicates that the selected tasks are to be initially released as available. The selection of particular tasks from a larger group may be performed in various manners in various embodiments, including based on ranking or prioritizing the tasks according to one or more specified criteria prior to the selection, and then taking the determined quantity of the highest ranked or prioritized tasks. Tasks may be ranked or prioritized in various manners in various embodiments, such as based on prioritizing the tasks that are the least or most recent, the tasks with the highest or lowest associated fee, based on a particular task requester that submitted the task, etc.

If it is instead determined in block 510 that the indication received in block 505 is not one or more new tasks being submitted, or in block 515 that one or more new tasks being submitted are part of an existing group, the routine continues to block 560 to determine whether an indication is received to review information about available tasks for one or more existing groups of tasks (e.g., based on receiving one or more new submitted tasks for that group; based on an indication to review all existing task groups, such as may be initiated in block 490 of FIG. 4; etc.). For example, each of various groups of tasks may be reviewed periodically or as otherwise indicated to determine whether the number of tasks that are currently available for that group satisfy a determined target quantity for that group and/or otherwise satisfy determined desired task performance characteristics for the group, or instead such review may be triggered in other manners (e.g., when new tasks are submitted for an existing group). If it is determined in block 560 that one or more existing groups are to be reviewed, the routine continues to block 565 to select the next such existing group, beginning with the first. The routine then continues to block 570 to in some embodiments optionally determine a new target quantity for the group (and/or other determined desired target performance characteristic) based on actual performance information for other tasks of the group that have previously been performed, such as to adjust the target quantity (and/or other determined desired target performance characteristic) based on changing or non-expected performance-related factor values or other conditions. In other embodiments, such ongoing monitoring of actual performance and modification of target quantity (or other task performance characteristics) may instead not be performed.

In the illustrated embodiment, after block 570 the routine continues to block 575 to determine whether the quantity of currently available tasks for the group deviates from the target quantity for the group sufficiently that the quantity of currently available tasks should be adjusted, such as for any deviation, for deviations of at least a minimum amount above and/or below the target quantity, etc. If the number of currently available tasks for the group is sufficiently lower than the target quantity for the group, such as based on prior performance of some of the available tasks that have been released for the group, the routine in block 575 selects additional tasks for the group to release as being available for performance so as to maintain the target quantity of tasks for the group if possible. In some embodiments, if the currently available tasks exceed the target quantity by a sufficient amount, some of those available tasks may be temporarily withdrawn from availability in order to reduce the number of available tasks to the target quantity, while in other embodiments the excess quantity may be allowed to disappear naturally as those excess quantity of tasks are performed by task performer users. In addition, in some embodiments, when selecting additional tasks for the group to release, the selection may be performed in a manner similar to that previously described with respect to block 540, such as based on a prior ranking or other priority associated with the tasks that have not yet been released, and in some embodiments may further perform a re-ranking or re-prioritization before doing the selection of block 575. In block 580, the routine then determines whether there are more existing groups whose currently available tasks are to be reviewed, and if so returns to block 565.

If it is instead determined in block 560 that the indication of block 505 is not to review the tasks that are available for one or more existing groups, the routine continues instead to block 585 to perform one or more other indicated operations as appropriate. For example, in some embodiments, the routine may receive information from a task requester or other entity (e.g., a human operator of the task exchange server) for one or more of the following non-exclusive list: to define desired task performance characteristics for one or more existing groups and/or for one or more new groups for which tasks will be submitted in the future, with those desired characteristics used as part of the determination of initially available tasks for a new group in block 530 or as part of a modification of a target quantity for an existing group in block 570 (e.g., as may be prompted by such a change in the desired task performance characteristics); to obtain information about current performance-related factors for one or more groups of tasks, such as based on monitoring of actual task performance; to specify or adjust expected values for performance-related factors; etc. After blocks 540, 550, or 585, or if it is instead determined in block 580 that no more existing groups are available, the routine continues to block 590 to provide an indication of selected tasks to be released as being available for performance, and in block 599 returns.

While the illustrated embodiment of routine 500 is performed with respect to different groups of tasks, such as based on those different groups of tasks being submitted by different task requesters and/or based on having differing desired task performance characteristics or performance-related factors, in other embodiments the routine may instead treat all tasks submitted to the task exchange server as being part of a single group, so as to apply a consistent set of task performance characteristics for all such tasks and/or to manage availability of all tasks together.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the disclosure. In addition, while certain aspects are presented below in certain claim forms, the inventors contemplate the various aspects in any available claim form. For example, while only some aspects of the disclosure may currently be recited as being embodied in a computer-readable medium, other aspects may likewise be so embodied.

What is claimed is:

1. A computer-implemented method comprising:
   receiving, by one or more configured computing systems, an indication of a group of a plurality of tasks submitted by a task requester for performance by a plurality of human task performer users via a task exchange server, the performance of the tasks of the group such that contention is possible between at least two of the task performer users if the at least two task performer users attempt to concurrently perform a single task;
   determining, by the one or more configured computing systems, a target quantity of multiple tasks based at least in part on a predicted level of contention between the task performer users that will occur for the target quantity of tasks;
   determining, by the one or more configured computing systems, a subset of the plurality of tasks to initially make available for performance by the task performer users, the subset of tasks including the determined target quantity of multiple tasks; and
   in response to the determining of the subset, releasing, by the one or more configured computing systems, the multiple tasks of the subset such that the released tasks are available for performance by the task performer users.

2. The method of claim 1 further comprising, after the release of the multiple tasks of the subset, facilitating performance of each of the multiple tasks by at least one of the human task performer users so as to obtain results of the performance of the task.

3. The method of claim 1 further comprising, after the release of the multiple tasks of the subset, facilitating performance of the multiple tasks by receiving requests sent by multiple of the task performer users that are each for information about at least one task of the group, and responding to each of the received requests by automatically selecting at least one task of the group in a random manner and providing information about the automatically selected at least one task to the task performer user who sent the received request.

4. The method of claim 1 further comprising, after the release of the multiple tasks of the subset, facilitating performance of the multiple tasks by receiving requests from multiple of the task performer users that are each for information about at least one task of the group, and responding to each of the received requests by automatically selecting one or more of the multiple tasks in such a manner that the selected tasks for at least some of the multiple task performer users differ from the selected tasks for at least some other of the multiple task performer users.

5. The method of claim 1 wherein the plurality of tasks of the group are of a first type and are each to be performed by multiple distinct task performer users, and wherein the method further comprises:
   automatically determining a second subset of tasks of a second indicated task group to initially make available for performance by the plurality of task performer users, the second indicated task group including a plurality of tasks of a second type, the determined second subset of tasks including a determined second target quantity of multiple tasks such that the determined second target quantity is distinct from the determined target quantity for the group of tasks of the first type based at least in part on performance-related information for tasks of the second type being expected to differ from performance-related information for tasks of the first type; and
   automatically releasing the multiple tasks of the second subset such that the released tasks of the second subset are available for performance by the task performer users.

6. The method of claim 1 wherein the determining of the subset of the determined target quantity of multiple tasks includes:
   determining an expected rate of performance of the plurality of tasks;
   determining an expected duration of possible contention between task performer users for each of the plurality of tasks; and
   predicting the determined target quantity based on the determined expected rate of performance and the determined expected duration of possible contention.

7. The method of claim 6 wherein the determining of the subset of the determined target quantity of multiple tasks further includes determining a desired level of contention for the plurality of tasks, the predicted level of contention being the determined desired level of contention, and determining the target quantity of multiple tasks by predicting that releasing the target quantity of tasks will produce the determined desired level of contention.

8. The method of claim 6 wherein the predicting of the determined target quantity is based on a performance prediction formula of $-D*R=Q*\ln(1-C)$, wherein Q represents the determined target quantity, D represents the determined expected duration of possible contention, R represents the determined expected rate of performance, and C represents the predicted level of contention.

9. The method of claim 1 wherein the determining of the subset of the determined target quantity of multiple tasks includes determining values for three factors from a group of factors that includes a rate of performance of the plurality of tasks, a duration of possible contention between task performer users for each of the plurality of tasks, a level of contention between the task performer users that will occur for an indicated quantity of tasks, and a quantity of multiple tasks to be concurrently available for performance, and includes predicting a value based on the determined three factor values for the other factor from the group of factors that is not one of the three factors.

10. The method of claim 1 wherein the determining of the subset of the determined target quantity of multiple tasks includes prioritizing the plurality of tasks and selecting the determined target quantity of the plurality of tasks based on the selected tasks having higher priorities than other tasks that are not selected.

11. The method of claim 1 further comprising, after the releasing of the multiple tasks of the subset:
    obtaining information about actual performance of at least some of the released multiple tasks by task performer users;
    determining a modified target quantity of tasks based at least in part on the obtained information about the actual performance; and
    releasing additional of the plurality of tasks so that the determined modified target quantity of tasks are concurrently available for performance.

12. The method of claim 11 wherein the determined modified target quantity of tasks is automatically predicted to be a quantity of tasks that if concurrently available will produce the predicted level of contention under task performance conditions indicated by the obtained actual performance information.

13. The method of claim 1 wherein the determined target quantity of multiple tasks indicates a quantity of tasks to maintain as being concurrently available for performance, and wherein the method further comprises, at each of one or more times after the releasing of the multiple tasks of the subset, releasing additional of the plurality of tasks as being available for performance such that a quantity of the plurality of tasks that are concurrently available for performance at that time after the releasing is approximately the determined target quantity of tasks.

14. The method of claim 1 wherein the determined target quantity of multiple tasks indicates a quantity of tasks to maintain as being concurrently available for performance, and wherein the method further comprises, at each of one or more times after the releasing of the multiple tasks of the subset, receiving multiple additional tasks for the indicated group and determining whether to initially release one or more of the additional tasks such that the released one or more additional tasks are available for performance, the determining of whether to initially release the one or more additional tasks being based at least in part on whether a quantity of concurrently available tasks of the group at the time is less than the determined target quantity.

15. The method of claim 1 wherein the releasing of the multiple tasks of the first subset includes initially releasing the multiple tasks of the first subset as being concurrently available for performance and inhibiting an initial release of other of the plurality of tasks that are not part of the first subset in such a manner that the other tasks are not initially concurrently available for performance with the multiple tasks of the first subset.

16. The method of claim 1 wherein the releasing of the multiple tasks of the first subset includes releasing all of the plurality of tasks of the group and controlling access by at least some task performer users to only the determined target quantity of tasks of the group by initially providing information to the at least some task performer users about only the multiple tasks of the first subset.

17. The method of claim 1 wherein the one or more configured computing systems are part of the task exchange server, the task exchange server acting as an intermediary to facilitate performance by human task performer users of tasks supplied by multiple unaffiliated task requesters.

18. A non-transitory computer-readable medium whose contents configure a computing system to automatically manage availability of multiple items, by performing a method comprising:
    receiving an indication of a plurality of related items that are candidates for use in an indicated role by a plurality of entities, the indicated role such that contention is possible based on multiple of the entities attempting to concurrently use one or more of the items;
    determining a target quantity of multiple of the related items based at least in part on a predicted level of contention between the plurality of entities that will occur for the determined quantity of items;
    determining a subset of the related items to initially make available for use for the indicated role, the subset including the determined target quantity of multiple items; and
    releasing the multiple related items of the subset so as to be available for use for the indicated role.

19. The non-transitory computer-readable medium of claim 18 wherein the configured computing system is at least part of a group of one or more computing systems that provide a task exchange server to facilitate performance by multiple human task performer users of multiple tasks from multiple other task requesters, wherein the related items are tasks submitted by one of the task requesters for performance, and wherein the use of the submitted tasks in the indicated role by the plurality of entities is performance of the tasks by the multiple human task performer users.

20. The non-transitory computer-readable medium of claim 18 wherein the computer-readable medium is a memory of the configured computing system.

21. The non-transitory computer-readable medium of claim 18 wherein the contents are instructions that when executed program the configured computing system to perform the method.

22. A computing system configured to manage availability of multiple tasks, comprising:
    one or more processors; and
    a task availability determiner component that is configured to, when executed by at least one of the one or more processors, manage availability of tasks for performance, by:
        receiving an indication of multiple tasks supplied by one or more task requesters for performance by task performer users;
        automatically determining at least some of the multiple tasks to make available for performance, the determined at least some tasks being of a target quantity and being selected based on at least one of a desired level of contention between task performer users for available tasks, a desired rapidity of completion of a first one or more of the at least some tasks, and a desired regularity of completion of the multiple tasks; and
        releasing the determined at least some tasks to be available for performance by the task performer users.

23. The computing system of claim 22 wherein the task availability determiner component is part of a task exchange server system that facilitates performance by multiple human task performer users of tasks supplied by multiple other task requesters, wherein the indicated multiple tasks are at least part of a group of a plurality of related tasks, wherein the determined at least some tasks are a subset of the indicated multiple tasks that are initially made available for performance while the other indicated multiple tasks are not made available for performance, and wherein the target quantity of multiple tasks is determined based at least in part on the at least one desired level of contention, desired rapidity of completion, and desired regularity of completion.

24. The computing system of claim 22 wherein the task availability determiner component includes software instructions for execution by the at least one processors of the computing system.

25. The computing system of claim 22 wherein the task availability determiner component consists of a means for the managing of the availability of the tasks for performance.

* * * * *